US012730303B2

(12) United States Patent
Vyatkin et al.

(10) Patent No.: US 12,730,303 B2
(45) Date of Patent: Sep. 8, 2026

(54) METHOD AND SYSTEM FOR QUANTUM KEY DISTRIBUTION

(71) Applicant: Terra Quantum AG, St. Gallen (CH)

(72) Inventors: Mikhail Vyatkin, St. Gallen (CH); Alexander Gutor, St. Gallen (CH); Nikita Kirsanov, St. Gallen (CH); Ekaterina Zhdanova, St. Gallen (CH); Mikhail Yarovikov, St. Gallen (CH); Alexander Smirnov, St. Gallen (CH); Alexander Bezruchenko, St. Gallen (CH); Gordey Lesovik, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 475 days.

(21) Appl. No.: 18/386,220

(22) Filed: Nov. 1, 2023

(65) Prior Publication Data

US 2024/0163087 A1 May 16, 2024

(30) Foreign Application Priority Data

Nov. 10, 2022 (EP) .................................... 22206735

(51) Int. Cl.
*H04L 9/08* (2006.01)
*G02B 27/00* (2006.01)
*H01S 3/067* (2006.01)

(52) U.S. Cl.
CPC ...... *G02B 27/0012* (2013.01); *H01S 3/06787* (2013.01); *H04L 9/0852* (2013.01)

(58) Field of Classification Search
CPC ... H04L 9/0852; H04L 9/0855; G02B 7/0012; H04B 10/70; H01S 3/06716;
(Continued)

(56) References Cited

U.S. PATENT DOCUMENTS 11,165,570 B2 11/2021 Parkin et al.
11,271,358 B2 3/2022 Reeves-Hall
(Continued)

FOREIGN PATENT DOCUMENTS

EP 1 075 095 A2 2/2001
JP 2002-118545 A 4/2002
(Continued)

OTHER PUBLICATIONS

Gisin et al., "Quantum Cryptography", published Nov. 16, 2024, "Reviews of Modern Physics", pp. 1-57 (Year: 2024).*
(Continued)

*Primary Examiner* — Melissa J Koval
(74) *Attorney, Agent, or Firm* — Fitch Even Tabin & Flannery LLP

(57) ABSTRACT

A method for quantum key distribution includes determining a ratio between a target maximum gain and a target operating gain of an optical amplifier; determining an active fiber section length such that the optical signals with a target maximum signal power are amplified with at most the target maximum gain; determining an operating pumping power of a pumping device below the maximum pumping power such that the optical signals are amplified with a target operating gain according to the determined ratio between the target maximum gain and the target operating gain; and determining a shared key between a first data processing device and a second data processing device by quantum key distribution comprising amplifying the optical signals via the optical amplifier by operating the pumping device at the operating pumping power.

20 Claims, 7 Drawing Sheets

(58) Field of Classification Search
CPC ........... H01S 3/094003; H01S 3/10023; H01S 3/1608; H01S 3/1611; H01S 3/1616; H01S 3/1618; H01S 3/06787
See application file for complete search history.

(56) References Cited

U.S. PATENT DOCUMENTS

| | | | |
|---|---|---|---|
| 2003/0035204 A1 | 2/2003 | Ahn et al. | |
| 2022/0271928 A1* | 8/2022 | Lesovik et al. | ....... H04L 9/0858 |

FOREIGN PATENT DOCUMENTS

| | | |
|---|---|---|
| JP | 2019-537863 A | 12/2019 |
| JP | 2022-126611 A | 8/2022 |

OTHER PUBLICATIONS

Japan Patent Office, Office Action in Japanese Patent Application No. 2023-179521, 7 pp. (Jan. 14, 2025).
Horiguchi et al., "Erbium-doped optical fiber amplifiers pumped in the 660- and 820-nm bands," *J. Lightwave Tech*, 12(5) (1994).
Jing et al., "The amplified model of erbium-doped fiber amplifier (EDFA) with cross-phase modulation (XPM)" *Optics Communications*, 220, 433-438 (May 15, 2003).

* cited by examiner

Fig. 1
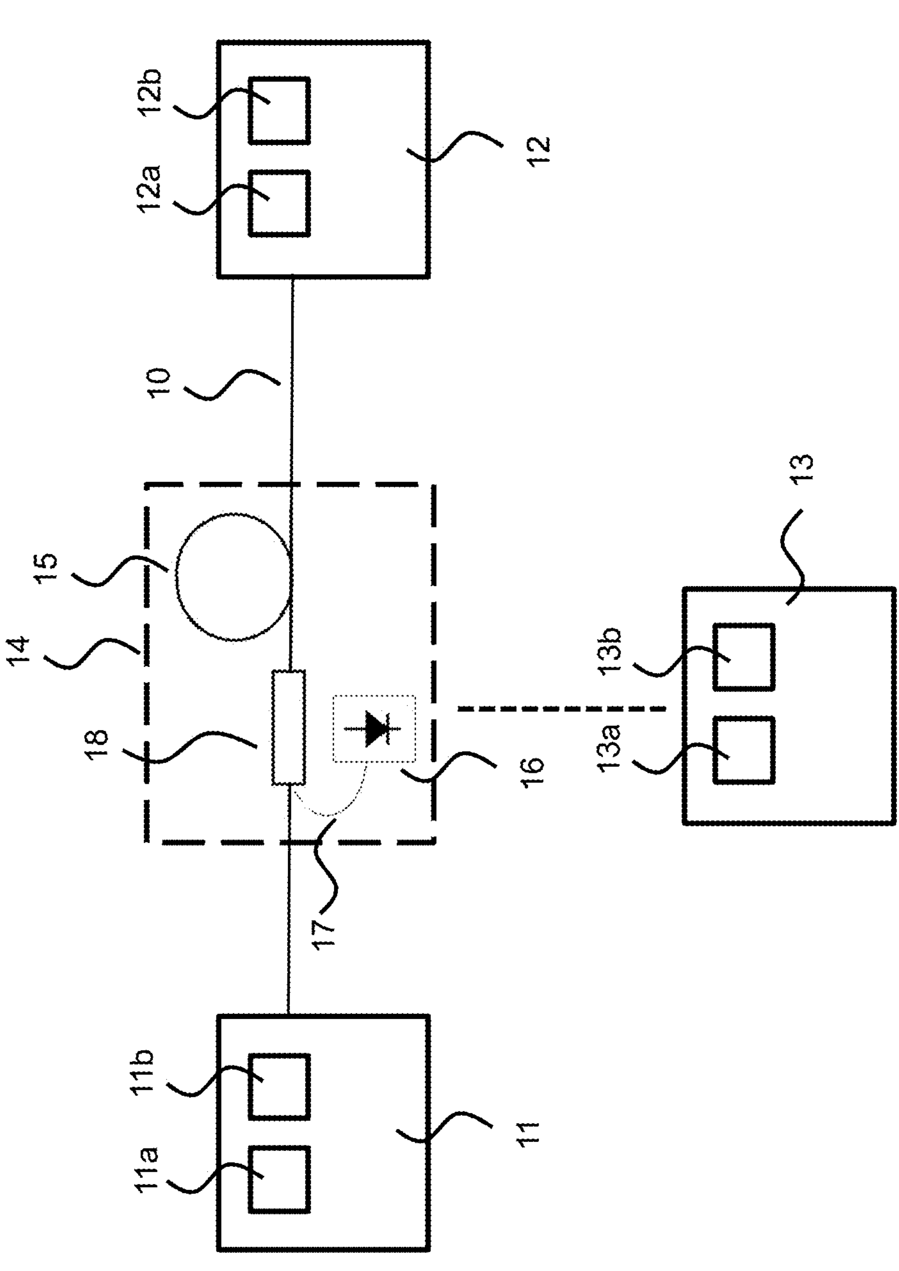

Fig. 4
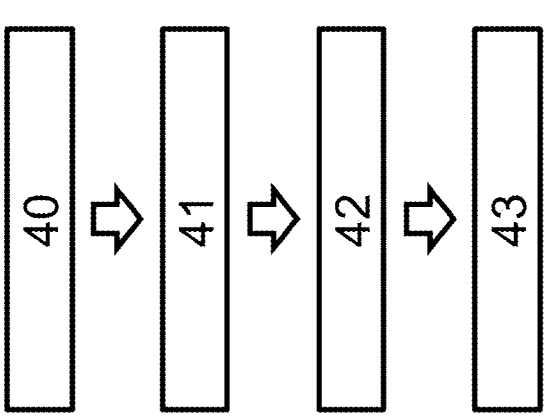
40
41
42
43

70
71
72
73
74
75
Backscattered power, dB
40
35
30
25
20
15
10
5
0
Distance, km
0
25
50
75
100
125
150

METHOD AND SYSTEM FOR QUANTUM KEY DISTRIBUTION

CROSS-REFERENCE TO RELATED APPLICATIONS

The instant application claims priority to European Patent Application No. 22206735.7, filed Nov. 10, 2022, which is incorporated herein in its entirety by reference.

FIELD OF THE DISCLOSURE

The present disclosure relates to a method and a system for quantum key distribution.

BACKGROUND OF THE INVENTION

Quantum key distribution (QKD) offers a way to secretly share symmetric keys between two parties with increased security during communication and authentication. Still, existing QKD protocols are frequently limited to communication over no more than a few kilometers. In particular, since information carrying quantum signals generally decay over large distances, repeaters along the quantum channel are required in order to amplify the signals.

For example, U.S. Pat. No. 11,165,570 B2 describes a method for operating a communications network node for QKD with an amplified optical section. Practical QKD realizations regularly rely on intermediate trusted nodes, which may severely compromise security.

The document US 2003/0 035 204 A1 describes amplified spontaneous emission as a pumping source, thereby enhancing an amplification capability of a two-stage L-band erbium-doped fiber amplifier. A graph representing the gain versus the length of an erbium-doped fiber is shown. U.S. Pat. No. 11,271,358 B2 pertains to the control of heating in active doped optical fibers.

BRIEF SUMMARY OF THE INVENTION

The present disclosure generally describes improved techniques for quantum key distribution, in particular with regard to increased security against potential eavesdropping when amplifying optical signals.

According to one aspect, a method (for amplifying optical signals) for quantum key distribution is provided, the method being implementable in a system which comprises a transmission line for transmitting optical signals between a first data processing device and a second data processing device and an optical amplifier disposed at the transmission line, wherein the optical amplifier comprises an active fiber section and a pumping device. The method comprises: determining a ratio between the target maximum gain and the target operating gain; determining an active fiber section length such that the optical signals with the target maximum signal power are amplified with at most the target maximum gain; determining an operating pumping power of the pumping device below the maximum pumping power such that the optical signals are amplified with a target operating gain according to the determined ratio between the target maximum gain and the target operating gain; and determining a shared key between the first data processing device and the second data processing device by quantum key distribution comprising amplifying the optical signals via the optical amplifier by operating the pumping device at the operating pumping power.

According to another aspect, a system (for amplifying optical signals) for quantum key distribution is provided, the system comprising a transmission line for transmitting optical signals between a first data processing device and a second data processing device, the system further comprising an optical amplifier disposed at the transmission line with an active fiber section and a pumping device, the system being configured to carry out the method according to at least one of the preceding claims.

As a result, quantum key distribution may be carried out securely by preventing an eavesdropper with potential access to the pumping device from effectively manipulating the pumping power for diverting parts of the optical signals. At the same time, unnecessarily high levels of energy consumption may be avoided.

BRIEF DESCRIPTION OF THE SEVERAL VIEWS OF THE DRAWING(S)

FIG. 1 is a graphical representation of an arrangement of a system for quantum key distribution and an eavesdropping device in accordance with the disclosure.

FIG. 4 is a graphical representation of a method for quantum key distribution in accordance with the disclosure.

DETAILED DESCRIPTION OF THE INVENTION

Figure 2:
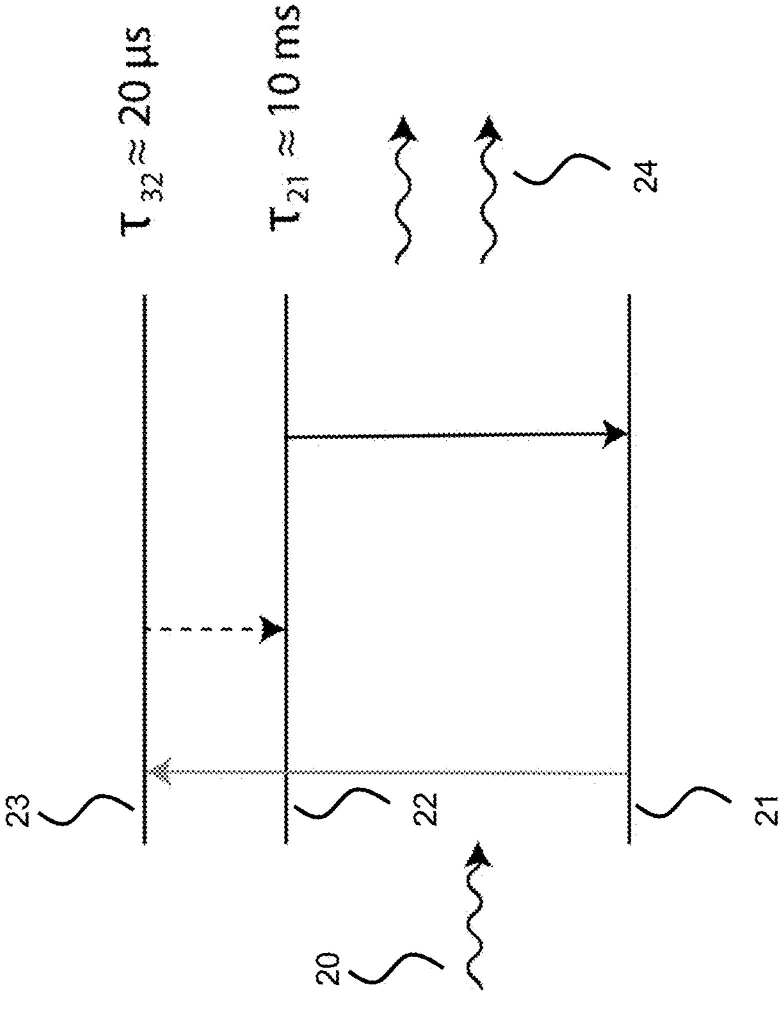
FIG. 2 is an energy diagram illustrating light amplification in an erbium-doped active fiber section in accordance with the disclosure.

In FIG. 1, a graphical representation of an arrangement comprising a system for quantum key distribution and an eavesdropping device 13 ("Eve") is shown. The system comprises a transmission line 10 with an optical fiber for transmitting optical signals, in particular classical signals and/or quantum signals, between a first data processing device 11 ("Alice") and a second data processing device 12 ("Bob"). The optical fiber may for example comprise a SMF-28 fiber.

At least one optical amplifier 14 with an active fiber section 15 and a pumping device 16 may be provided/disposed/arranged at the transmission line 10. In particular, a plurality of optical amplifiers 14 may be provided at the transmission line 10. The optical amplifiers 14 may for example be disposed equidistantly along the transmission line 10, for example with an amplifier interval between 30 km and 200 km, preferably between 30 km and 100 km, more preferably between 30 km and 60 km. By increasing the amplifier interval, cross-talk between individual optical amplifiers 14 may be mitigated or prevented. The distance between any of the optical amplifiers 14 and any of the first and second data processing devices 11, 12 may also be at least 30 km.

The first data processing device 11 may comprise a first processor 11*a* and a first memory 11*b* and the second data processing device 12 may comprise a second processor 12*a* and a second memory 12*b*. The first and the second data processing device 11, 12 may or may not be part of the system. The first data processing device 11 and the second data processing device 12 are connected to the transmission line 10. The transmission line 10 may comprise a quantum channel configured to convey the quantum signals. Further, a classical channel configured to convey the classical signals may be provided. The classical channel may be provided within the transmission line 10 or separately.

The system may comprise a plurality of further data processing devices, in particular, a third data processing device with a third processor and a third memory (not shown). The third data processing device may be connected to the transmission line 10. Additionally or alternatively, the third data processing device can exchange the classical signals and/or the quantum signals with the first data processing device 11 and/or the second data processing device 12 via further communication channels. In case the system is configured to carry out a step, such a step may for example be carried out in at least one of the first data processing device 11, the second data processing device 12, and the third data processing device.

The eavesdropping device 13 with an eavesdropping processor 13*a* and an eavesdropping memory 13*b* represents a device outside the system with potential access to the transmission line 10, in particular to the pumping device 16. The eavesdropping device 13 may be arranged at the transmission line 10 such that the optical signals transmitted via the transmission line 10 are at least partially received and/or retransmitted by the eavesdropping device 13. The eavesdropping device 13 may also access the further communication channels.

The first memory 11*b*, the second memory 12*b*, the third memory, and the eavesdropping memory 13*b* may each comprise a quantum memory that is configured to store the quantum signals and a classical memory that is configured to store the classical signals. The quantum memory may be provided using optical delay lines, controlled reversible inhomogeneous broadening (CRIB), a Duan-Lukin-Cirac-Zoller (DLCZ) scheme, revival of silenced echo (ROSE), and/or hybrid photon echo rephasing (HYPER).

The first data processing device 11, the second data processing device 12, the third data processing device, and the eavesdropping processing device 13 may each comprise means to transmit and/or to receive quantum states via optical signals.

Optical Amplification

The optical signals are amplified/repeated by optical amplification via stimulated emission. The optical amplification takes place in the active fiber (section) 15 of the optical amplifier 14. The active fiber section 15 may for example be an $Er^{3+}$-doped fiber which may be pumped via the pumping device 16 at a pumping wavelength of 980 nm and which comprises an amplified signal wavelength at around 1530 nm. Additionally or alternatively, thulium-doped fibers (to be pumped at 1450 nm to 1490 nm), neodymium-doped fibers (to be pumped at 1300 nm), or ytterbium-doped fibers (to be pumped at 1000 nm) may be employed. Employing erbium-doped fibers is beneficial in that the amplified signal wavelength fits well into the transmission window of standard silica fibers.

In FIG. 2, an energy diagram illustrating light amplification in the active fiber section 14 being an erbium-doped fiber section is shown. Pumping radiation 20 with pumping wavelength of 980 nm emitted from the pumping device 16 is absorbed in the erbium-doped fiber section, so that erbium ions transit from a ground state 21 ($^4I_{15/2}$) to a short-lived state 23($^4I_{11/2}$) with relaxation time $\tau_{32}\approx 20$ µs. From the short-lived state 23, the Erbium ions non-radiatively relax to a metastable state 22 ($^4I_{13/2}$) with longer relaxation time $\tau_{21}\approx 10$ ms.

Optical signals/optical pulses passing the erbium-doped fiber section result in a stimulated transition from the metastable state 22 to the ground state 21 together with a coherently synchronized emission of additional photons 24 as part of the optical signals. The magnitude of the resulting signal amplification depends on the concentration of the erbium ions, the length of the active fiber section 14 and the power of the pumping radiation.

Figure 3:
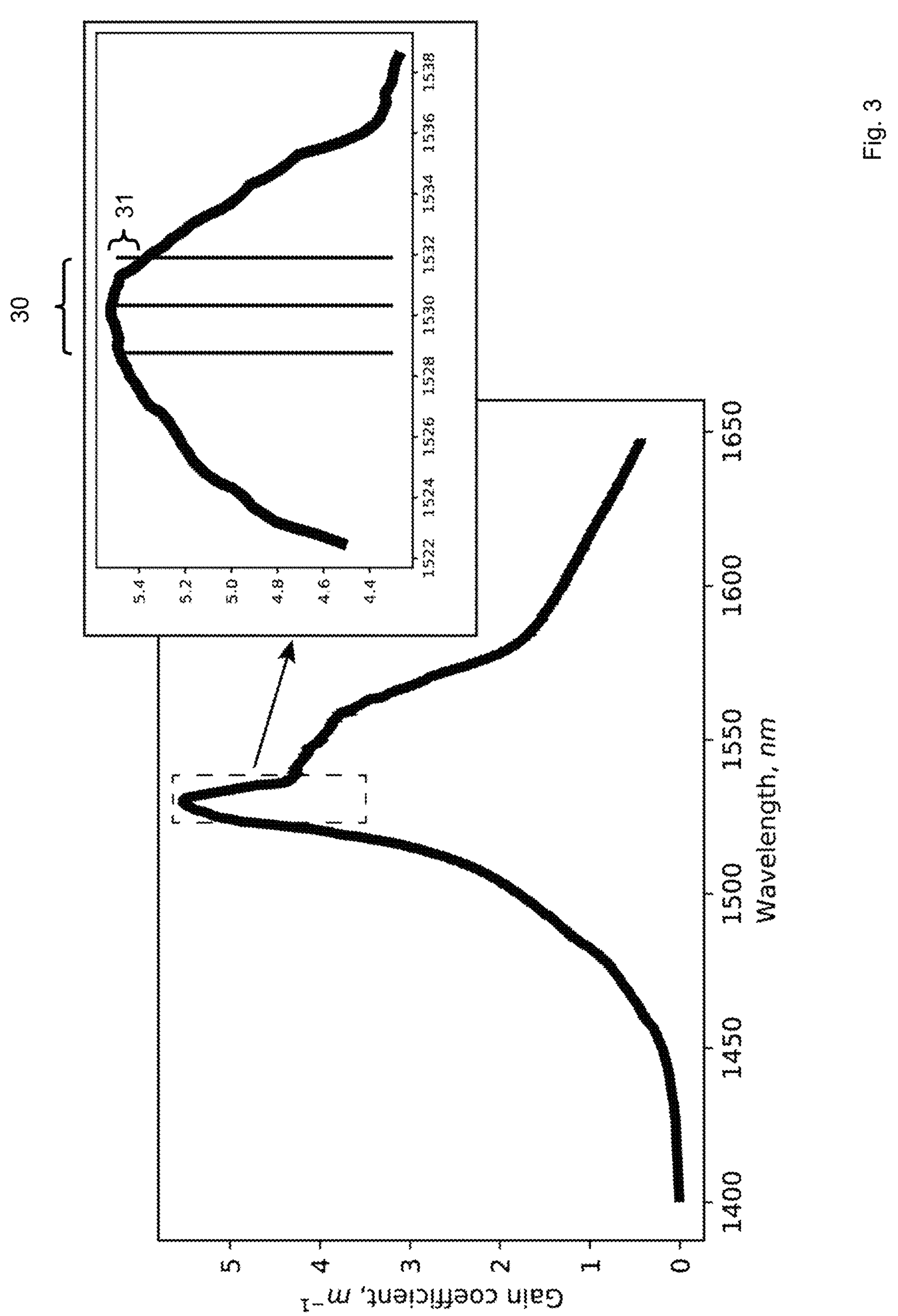
FIG. 3 is a plot of the gain coefficient as a function of the signal wavelength in accordance with the disclosure.

The gain (amplification factor) particularly depends on the wavelength of the input signal. FIG. 3 shows a plot of a (fiber length-dependent) gain coefficient in units of $m^{-1}$ as a function of the signal wavelength in nm. The operational range of the signal wavelength may be limited to a region around 1530 nm, which constitutes a relatively flat peak region of the gain coefficient. In particular, the gain coefficient in a signal wavelength range 30 from 1529 nm to 1531 nm results in a spectral gain deviation 31 of 1% and the signal wavelength range 30 being 1526 nm to 1534 nm results in the spectral gain deviation 31 being 10%.

Referring back to FIG. 1, the pumping radiation 20 from the pumping device 16 is fed via a supply fiber 17 and a coupling element 18 such as a wavelength-division multiplexing (WDM) element to the transmission line 10, in particular, the active fiber section 15. Thus, the active fiber section 15, in which optical amplification takes place, is provided with the pumping radiation 20 necessary for exciting dopant atoms. The WDM element is a beam splitter-like device for guiding radiation of different wavelengths into a single optical fiber and is connected to the active fiber section 15 and the pumping device 16. The pumping device 16 may for example be a diode or a laser, which is in particular configured to emit radiation with the pumping wavelength.

For erbium-doped active fiber sections 14, the pumping device 16 operates at a wavelength of 980 nm and may be connected to WDM via a passive HI1060FLEX fiber optimized for this wavelength. The amplification takes place for optical signals at wavelengths around 1530 nm. To constrain unwanted local losses to around 0.1%, all fiber connections (e.g., between the active fiber section(s) and the passive fiber sections of the transmission line may be spliced.

The transmission line 10 may be sealed with a (e.g., silicone-based) encapsulating compound with an admixture of metal powder (e.g., aluminum). The encapsulating compound may have high heat conductivity (to prevent overheating). The encapsulating compound allows for substantially complicating external mechanical intrusions (in particular, without detection) and for suppressing leakage of radiation into the environment. The metal powder allows for optical signals leaking outside the fibers to dissipate into heat. As a result, the optical signals can no longer be deciphered even if leaked.

Unlike standard optical amplifier setups, the system does not comprise optical isolators or tap couplers. Isolators are configured to allow light to pass only in one direction and are typically used to minimize the risk of multiple reflections inside the active fiber section 15 which could result in the optical amplifier 14 essentially becoming a laser.

Tap couplers typically divert about 1% of the optical pulses to photodetectors in order to monitor the optical amplifier 14 (in particular, input and output powers, operational modes and gain coefficients). This fraction may possibly be seized by the eavesdropper.

Since the method does not employ isolators or tap couplers, it may rely solely on splicing for mitigating back reflections and avoiding any lasing modes in the active fiber sections 15.

Operating Optical Amplifiers for Quantum Key Distribution

In FIG. 4, a graphical representation of a method for quantum key distribution is shown.

Initially (step 40), the transmission line 10 for transmitting optical signals between the first data processing device 11 and the second data processing device 12 is provided and the optical amplifier 14 with the active fiber section 15 and the pumping device 16 is disposed on the transmission line 10.

The gain/amplification factor G of the optical amplifier 14 also depends on the power of the pumping radiation (pumping power) $P_p$, the active fiber (section) length l and the concentration of the dopant atoms in the active fiber section 15. A possible attack by an eavesdropper on the optical amplifier 14 may involve increasing the pumping power $P_p$ and diverting the resulting surplus of the amplified optical signals. In other words, the eavesdropping device 13 may be provided with a copy of the optical signals by accessing the optical amplifier 14 and "overclocking" its amplifying capacity.

This kind of attack may be prevented as follows: A ratio $G_{max}/G_{op}$ between a target maximum gain $G_{max}$ and a target operating gain $G_{op}$ of the optical amplifier 14 is determined from a minimum detectable optical signal leakage $$r_E^{min}$$

and/or a resolution for measuring the optical signals. The minimum detectable optical signal leakage $$r_E^{min}$$

may be determined from a ratio of the value of optical signal fluctuations and the photon number per pulse. Further, the active fiber section length l is determined such that the optical signals emitted from the first or second data processing device 11, 12 with a target maximum signal power $P_{s,max}$ are amplified with at most the target maximum gain $G_{max}$ for any pumping power (step 41).

In a next step 42, an operating pumping power $P_{p,op}$ of the pumping device 16 is determined such that the optical signals are amplified with a target operating gain $G_{op}$ smaller than the target maximum gain $G_{max}$ according to the determined ratio $G_{max}/G_{op}$ between the target maximum gain $G_{max}$ and a target operating gain $G_{op}$ After having determined the active fiber section length l (step 41) and the operating pumping power $P_{p,op}$ (step 42) as described above, a shared key between the first data processing device 11 and the second data processing device 12 is determined by quantum key distribution which comprises amplifying optical signals (emitted from the first or the second data processing device 11, 12) via the optical amplifier 14 by operating the pumping device 16 at the operating pumping power (step 43).

The active fiber section 15 comprises precisely the minimum (optimal) number of dopant ions necessary to amplify the optical signals with target maximum gain $G_{max}$ Provided that the optical amplifier 14 operates at sufficiently large pumping power, almost all dopant atoms are inversely populated, and any further increase of pumping power results in a negligible increase of gain. Thus, the described attack becomes ineffective.

The optimal number of dopant atoms in the active fiber section 15 may be determined as explained in the following by adjusting the active fiber section length l. The population of the second energy level, the metastable state 22, at position z of the active fiber section 15 is given by:

$$n_2(z) = \rho \frac{\frac{P_p(z)}{P_{sat}(v_p)} + \frac{1}{1+\eta_s}\frac{P_s(z)}{P_{sat}(v_s)}}{1 + \frac{P_s(z)}{P_{sat}(v_s)} + \frac{P_p(z)}{P_{sat}(v_p)}}, \tag{1}$$

with dopant concentration ρ, pumping radiation frequency $v_p$, frequency of the signal frequency $v_s$, ratios $$\eta_s = \frac{\sigma_e(v_s)}{\sigma_a(v_s)},\ \eta_p = \frac{\sigma_e(v_p)}{\sigma_a(v_p)},$$

emission cross-sections $\sigma_e(v_p)$, $\sigma_e(v_s)$, absorption cross sections $\sigma_a(v_p)$, $\sigma_a(v_s)$, (local) pumping power $P_p$ (z), (local) signal power $P_s(z)$, and saturation powers $P_{sat}(v_p)$, $P_{sat}(v_s)$.

The emission cross-sections $\sigma_e(v_p)$, $\sigma_e(v_s)$ and absorption cross-sections $\sigma_a$ $(v_p)$, $\sigma_a(v_s)$ correspond to probabilities of dopant ions to emit or, respectively, absorb a photon with frequency $v_p$ or $v_s$. The values of $\sigma_e(v_p)$, $\sigma_e(v_s)$, $\sigma_a(v_p)$, and $\sigma_a(v_s)$ may be determined via emission and absorption spectra (e.g., from spectral analysis) and subsequent division by the dopant concentration ρ. An emission spectrum is an output spectrum of the active fiber section 15 without input optical signals but being pumped (in particular, large pumping powers around 500 mW for G≈10 may be employed). An absorption spectrum corresponds to the difference between input spectrum and output spectrum of the active fiber section 15 without pumping.

The saturation power $P_{sat}(v_s)$ for the signal and $P_{sat}(v_p)$ for the pump may be determined by $$P_{sat}(v_{s,p}) = \frac{hv_{s,p}\pi\omega_{s,p}^2}{(\sigma_a(v_{s,p}) + \sigma_e(v_{s,p}))\tau_{21}} = \frac{hv_{s,p}\pi\omega_{s,p}^2}{\sigma_a(v_{s,p}) + (1+\eta_{s,p})\tau_{21}}, \tag{2}$$

wherein $\omega_s$ is a mode power radius (i.e., a radius of a power distribution of the signal inside the optical fiber which depends on a fiber core radius, refractive indices of the fiber core and cladding, and the signal wavelength), and τ is the time of relaxation from the metastable state 22 to the ground state 21 (typically 10 ms for erbium in silica). The amplification factor/gain G for the case when $n_2$ is close to a constant value along active fiber may be determined by:

$$G = \exp[\sigma_a(v_s)\rho \cdot ((\eta_s + 1)n_2 - 1)l]. \tag{3}$$

The condition that for the case when $n_2$ is close to the constant value is reached when $P_p >> P_{sat}$ $(v_p)$.

The active fiber section length l may be determined by:

$$l = \frac{\ln(G)}{\sigma_a(v_s)\rho \cdot ((\eta_s+1)n_2-1)}. \tag{4}$$

The denominator $\sigma_a(v_s)\rho\cdot((\eta_s+1)n_2-1)$ may be determined by determining, for particular active fiber section length l, the gain G as the ratio between output and input optical signal photon numbers and employing Eq. (4). To provide essentially complete population inversion, the pumping power may be particularly large, e.g., for $G\approx 10$, the pumping power may be 500 mW or higher.

Since the gain G depends on the signal power $P_s$ and is smaller for larger values of signal power $P_s$, the target maximum gain $G_{max}$ and the target operating gain $G_{op}$ may be determined for the intended (target) maximum signal power $P_{s,max}$. Due to the monotonicity of the quantum relative entropy, the fact that optical signals with smaller signal power $P_s$ are amplified more does not make them more distinguishable. Thus, the eavesdropper would not be able to extract more information from the amplified optical signals than may be tolerated. Notably, the signal intensities may be reduced by the first data processing device 11 and/or the second data processing device 12 so that 0 bit optical signals and 1 bit optical signals are less distinguishable in case of parts of the optical signals being detected as diverted/stolen.

The maximum pumping power $P_{p,max}$ is typically limited by the physical capacity of the pumping device 16 and/or by electronically set restrictions. The eavesdropper may want to couple another pumping device to the active fiber section 15, but this may be detected by the physical line control. Moreover, the encapsulating material may have to be penetrated which may damage on the equipment. The eavesdropper may thus be restricted to manipulate the gain G only by increasing the pumping power of the pumping device 16 of the optical amplifier 14—at maximum to its physical limit.

In an exemplary transmission line 10 with a transmission line length of 1000 km, the photon number per pulse N may range from about $10^2$ to $10^5$ photons and the signal pulse duration may be $t_s$=0.8 ns, which corresponds to a signal power $P_s$ of $P_s=Nhv_s/t_s$. For a signal wavelength $\lambda_s=c/v_s$=1530 nm, the signal power $P_s$ may be up to 10.81 μW. With an amplifier interval of 50 km, i.e., disposing optical amplifiers 14 every 50 km, the photon number drops by a factor of 10 between two optical amplifiers 14 (transmission coefficient T=0.1). Correspondingly, the target operating gain $G_{op}$ of a single optical amplifier 14 should be $G_{op}$=10 to compensate for optical signal decay.

For an optical pulse with initially $n=10^{14}$ photons, the photon number decreases to $Tn=10^{13}$ photons after 50 km. The optical amplifier 14 restores the photon number back to $GTn=10^{14}$ but also adds noise. Since photons are subject to Poisson statistics, optical signal fluctuations near the amplifier are $\delta n=\sqrt{T\cdot n}\approx 3\cdot 10^6$. These fluctuations are amplified by the optical amplifier 14 with factor G, resulting in $\delta n^G\approx\sqrt{GTn}3\cdot 10^7$.

Passing a plurality of M optical amplifiers 14, each of which contributes fluctuations independently, the total fluctuations are increased by a factor of $\sqrt{M}$. E.g., for 400 optical amplifiers 14 on a 20 000 km long transmission line 10, the fluctuations increase by a factor of 20.

The fluctuations at the second data processing device 12 are hence $\delta n^B\approx\sqrt{M}\delta n^G\approx 6\cdot 10^8$. Thus, the minimum detectable (optical signal) leakage $$r_E^{min} \text{ is } r_E^{min} \approx \delta n^B/n \approx 10^{-5}.$$

If the target operating gain $G_{op}$ is 10, the surplus potentially available to the eavesdropper should not exceed $\delta G=10^{-4}$ so that $$\delta G/G \approx r_E^{min} \approx 10^{-5}$$

(for a single amplifier:

$$r_E^{min} \approx 10^{-7}$$

Thus, the active fiber section length l should be such that at the maximum pumping power $P_{p,max}$, the corresponding gain G (target maximum gain $G_{max}$) is equal to $10+10^{-4}$ (while the target operating gain $G_{op}$ is 10).

The active fiber section length l may be determined via Eq. (4) with $G=G_{max}$ and $P_p=P_{p,max}$. The active fiber section length l may also be determined by (i) providing the active fiber section with an initial length $l_{init}$ (e.g., 110% of an initial rough estimate of the active fiber section length l), (ii) operating the pumping device 16 at maximum pumping power $P_{p,max}$ (dependent on the pumping device 16) and determining the gain value G, and (iii) adjusting (e.g., decreasing) the length of the active fiber section 15. This is carried out iteratively until the gain value G is equal to the target maximum gain $G_{max}$. The active fiber section length l is then set as the length of the active fiber section for which the gain value G is equal to the target maximum gain $G_{max}$.

Having established the active fiber section length l (step 41), the operating pumping power $P_{p,op}$ according to step 42 may be determined as follows. The operating pumping power $P_{p,op}$ is smaller than the maximum pumping power $P_{p,max}$. The pumping device 16 could also be operated during QKD at maximum pumping power $P_{p,max}$ in order to ensure maximum population inversion. This may however entail high energy-consumption as well as equipment degradation (in particular, of the (active) optical fiber and the pumping device 16). According to the proposed method, the operating pumping power $P_{p,op}$ is determined such that no matter how much the eavesdropper with access to the pumping device 16 increases the pumping power, they cannot extract a proportion of the optical signals greater than the minimum leakage $$r_E^{min}$$

detectable with transmission line control.

Figure 5:
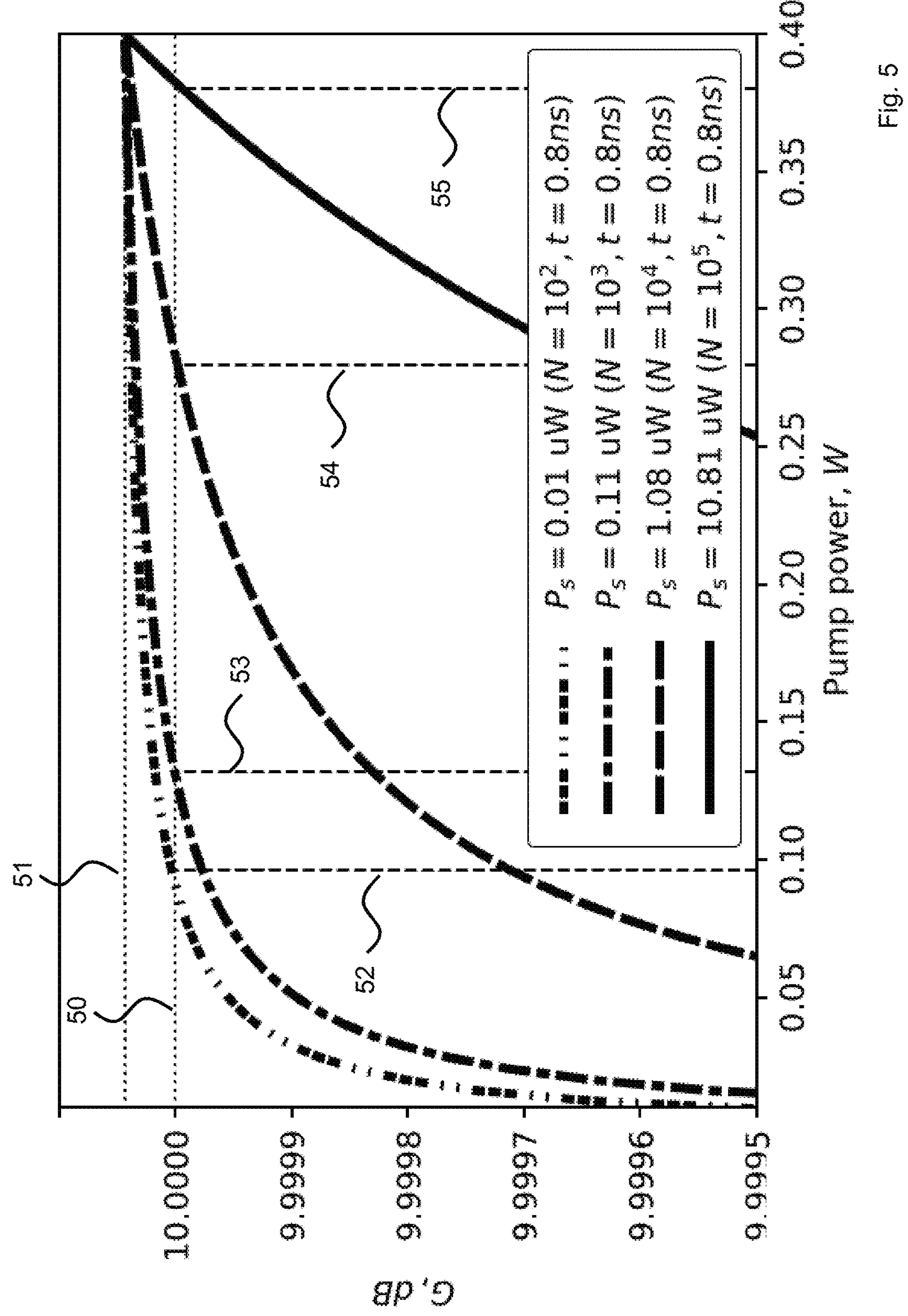
FIG. 5 is a plot of the gain of an optical amplifier as a function of the pumping power for different signal powers in accordance with the disclosure.

FIG. 5 shows a plot of the gain G of the optical amplifier 14 in dB as a function of the pumping power (pump power) in W with established active fiber section length l for different signal powers $P_s$. In this example, the pumping power of the optical amplifier 14 is limited by 400 mW ($P_{p,max}$=400 mW). The target operating gain $G_{op}$ is marked with horizontal line 50 and the target maximum gain *G max* with horizontal line 51.

The (optimal) operating pumping powers $P_{p,op}$ correspond to the intersection of each signal power-specific curve with the horizontal line 50. The concrete values for $P_{p,op}$ may be determined from Eq. (1)-(3) with $G=G_{op}$ and l as determined according to step 41. It is noted that $n_2$ in Eq. (3) depends, according to Eq. (1), on the pumping power $P_p$ and the signal power $P_s$. The optimal operating pumping powers $P_{p,op}$ for different signal powers $P_s$ are marked by vertical lines 52-55. For FIG. 5, the following parameters were employed:

$$\sigma_a(v_s) = 8.23\cdot 10^{-25}\text{m}^2,\ \sigma_e(v_s) = 7.2\cdot 10^{-25}\text{m}^2,\ \sigma_a(v_p) = 4.93\cdot 10^{-25}\text{m}^2,\ \sigma_e(v_p) = 1\cdot 10^{-25}\text{m}^2,\ \lambda_s = 1530\text{ nm},\ \lambda_p = 980\text{ nm},\ \tau = 10\text{ ms},\ \rho = 1\cdot 10^{-25}\text{m}^2,\ \omega_s = 1.68\ \mu\text{m},\ \omega_p = 1.41\ \mu\text{m}.$$

For given target maximum photon numbers N and target maximum signal powers $P_{s,max}$, the following operating pumping powers $P_{p,op}$ are determined.

| N [photons] | $P_{s,\,max}$ [W] | $P_{p,\,op}$ [W] |
|---|---|---|
| $10^2$ | $1.08\cdot 10^{-8}$ | 0.104 |
| $10^3$ | $1.08\cdot 10^{-7}$ | 0.140 |
| $10^4$ | $1.08\cdot 10^{-6}$ | 0.284 |
| $10^5$ | $1.08\cdot 10^{-5}$ | 0.384 |

After having established the active fiber section length l according to step 41 and the operating pumping power $P_{p,op}$ according to step 42, the shared key between the first data processing device 11 and the second data processing device 12 may be determined by quantum key distribution according to step 43, which comprises correspondingly amplifying optical signals transmitted between the first data processing device 11 and the second data processing device 12.

Steps of Determining the Shared Key

Figure 6:
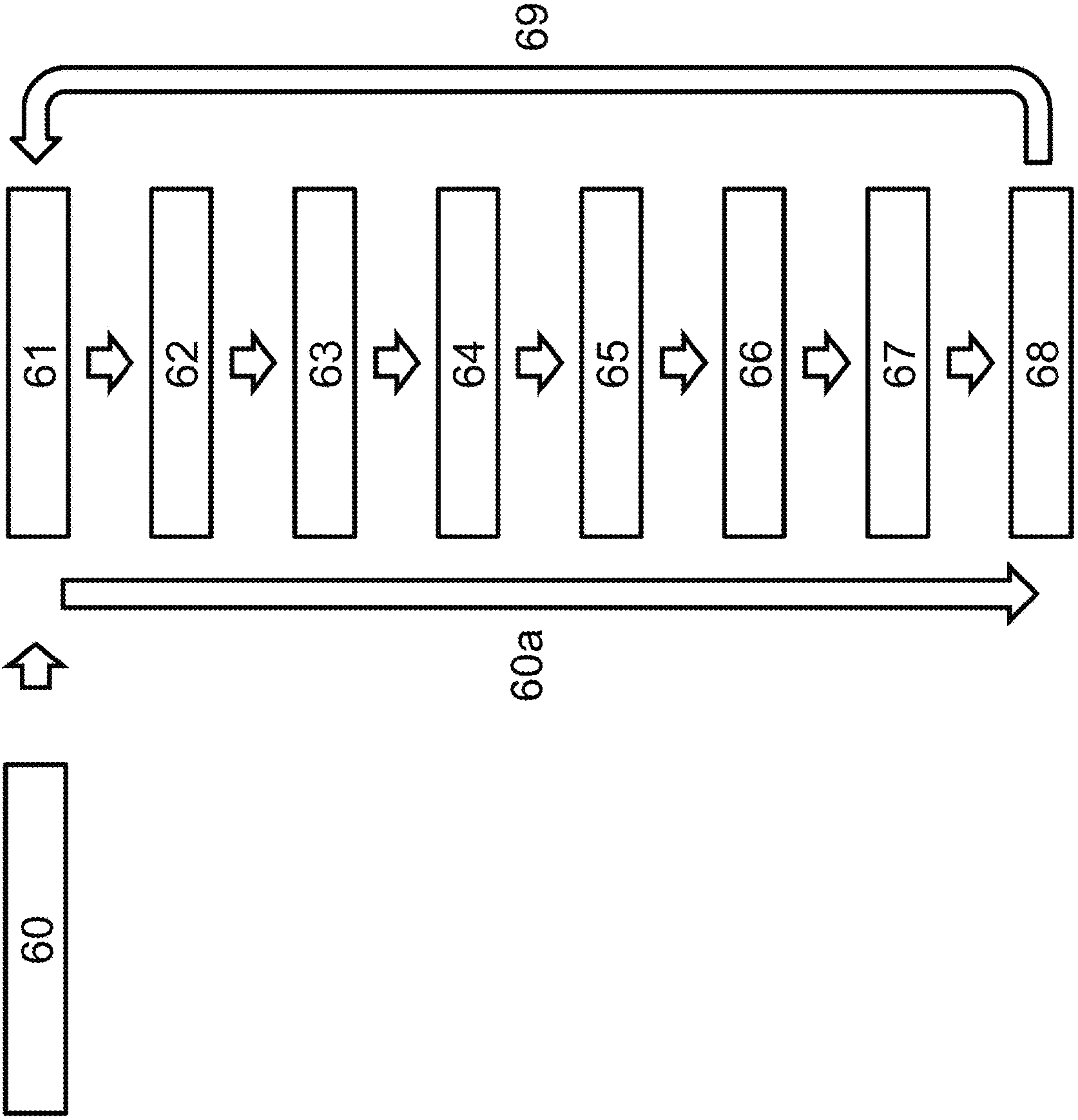
FIG. 6 is a graphical representation of method steps for determining a shared key by quantum key distribution in accordance with the disclosure.

In FIG. 6, a graphical representation of (sub-)steps for determining a shared key by quantum key distribution corresponding to step 43 is shown. The first data processing device 11 and the second data processing device 12 are connected via an authenticated (public) classical channel and the optical fiber(s) of the transmission line 10 serve as a quantum channel.

In an initial step 60, an initial inner loss profile of the transmission line 10 (in particular its optical fiber segments) is determined, which essentially represents the natural signal losses in the transmission line 10. At this preliminary step, it should be ensured that no eavesdropper is accessing the transmission line 10. The initial loss profile may be shared between the first and the second data processing device 11, 12 via the authenticated classical communication channel.

In a first step 61, physical loss control of the transmission line 10 is carried out (e.g., by the first and the second data processing device 10, 11). In particular, an inner loss profile is determined and, preferably, shared between the first and the second data processing device 11, 12 via the classical channel.

By comparing the thus updated inner loss profile with the initial inner loss profile, a fraction $\tau_E$ of the signal possibly seized by the eavesdropper may be determined. For example, if, in a section of the transmission line 10 not comprising optical amplifiers 14, the natural signal losses in this section are represented by $r_0$ and the eavesdropper intercepts an intercepted fraction $r_E$ of the signal, then the intercepted fraction $r_E$ can be derived from total losses $r_t$ via the following relation:

$$(1-r_t) = (1-r_E)(1-r_0). \tag{5}$$

If the intercepted fraction $r_E$ grows too large, so that the legitimate users lose their informational advantage over the eavesdropper, the protocol is terminated. Termination of the protocol depends on the length of the transmission line 10 and the distance between two of the optical amplifiers 14. The protocol may in particular be terminated if an effective key rate is below a target key rate value.

In a second step 62, using a random number generator, a bit sequence of sequence length L is determined in the first data processing device 11.

In a third step 63, the bit sequence is encoded into an optical signal comprising a series of L key signal pulses (coherent light pulses), which are transmitted to the second data processing device 12 (via the transmission line 10).

The signal bits 0 and 1 respectively correspond to coherent states $|\gamma_0\rangle$ and $|\gamma_1\rangle$. The particular way of encoding 0 and 1 signal bits into parameters of the coherent states $|\gamma_0\rangle$ and $|\gamma_1\rangle$ may vary. For example, the signal bits may be encoded into coherent light pulses with different intensities/photon numbers and same phases or, alternatively, into coherent light pulses with same intensities and different phases.

Optical signals with relatively high signal intensities may be employed as long as the signal proportion available to the eavesdropper is small and the eavesdropping device 13 may obtain only a quantum number of photons, i.e., the measurement precision is obscured by quantum noise. In the case of intensity ciphering, this may be the case when $\max(|\gamma_0|, |\gamma_1|) \sim ||\gamma_1|^2 - |\gamma_0|^2|$.

In a fourth step 64, the optical signals/coherent light pulses are amplified by one or a plurality of optical amplifiers 14 provided along the transmission line 10. Each optical amplifier 14 comprises an active fiber section 15 with the active fiber section length l determined according to step 41. Further, each optical amplifier 14 comprises a pumping device 16 which is operated with the operating pumping power $P_{p,op}$ according to step 42, resulting in a target operating gain $G_{op}$. Even if the eavesdropper increases the pumping power beyond the operating pumping power $P_{p,op}$ up to the maximum pumping power $P_{p,max}$, the corresponding possible signal leakage is constrained to the order of magnitude of the minimum detectable (optical signal) leakage $$r_E^{min}.$$

In a fifth step 65, the optical signals are received and measured by the second data processing device 12. A corresponding received bit sequence is determined in the second data processing device 12. It may be assumed that all determined artificial losses represent the intercepted fraction $r_E$ of the signal.

In a sixth step 66, inconclusive signal bits, which correspond to quantum measurements in the second data processing device 12 determined as inconclusive, are discarded from the bit sequence in the first data processing device 11 and the received bit sequence in the second data processing device 12. To this end, bit positions of the inconclusive signal bits are transmitted via the classical channel from the second data processing device 12 to the first data processing device 11.

In a seventh step 67, by disclosing a part of the bit sequence and/or the received bit sequence via the classical channel, an error rate may be determined, and error correction may be performed on the bit sequence and the received bit sequence by the first data processing device 11 and the second data processing device 12, respectively. The error correction maybe carried out employing, e.g., low-density parity-check (LDPC) codes. As a result, an error corrected bit sequence is determined in the first and the second data processing device 11, 12.

In an eighth step 68, an amplified key sequence is determined from the error corrected bit sequence using privacy amplification. The amplified key sequence is shorter than the error corrected bit sequence and any potential eavesdropper has none or negligibly small information on the amplified key sequence. The amplified key sequence represents a shared key sequence between the first and the second data processing device 11, 12 as a result of quantum key distribution.

The steps from the first step 61 to the eighth step 68 may be repeated (arrow 69) and the amplified key sequences concatenated to a (total) shared key until a total length of the shared key is as large as required by the application at hand.

During all steps 61 to 68, the transmission line 10 may be continuously controlled, 60*a*. Hence, a signal loss profile is determined and, preferably, shared between the first and the second data processing device 11, 12 via the classical channel. In case where the integrity of the transmission line 10 is compromised to the extent of a considerable risk that the eavesdropper would decipher the scattering losses, the protocol may be terminated.

Transmission Line Control

Figure 7:
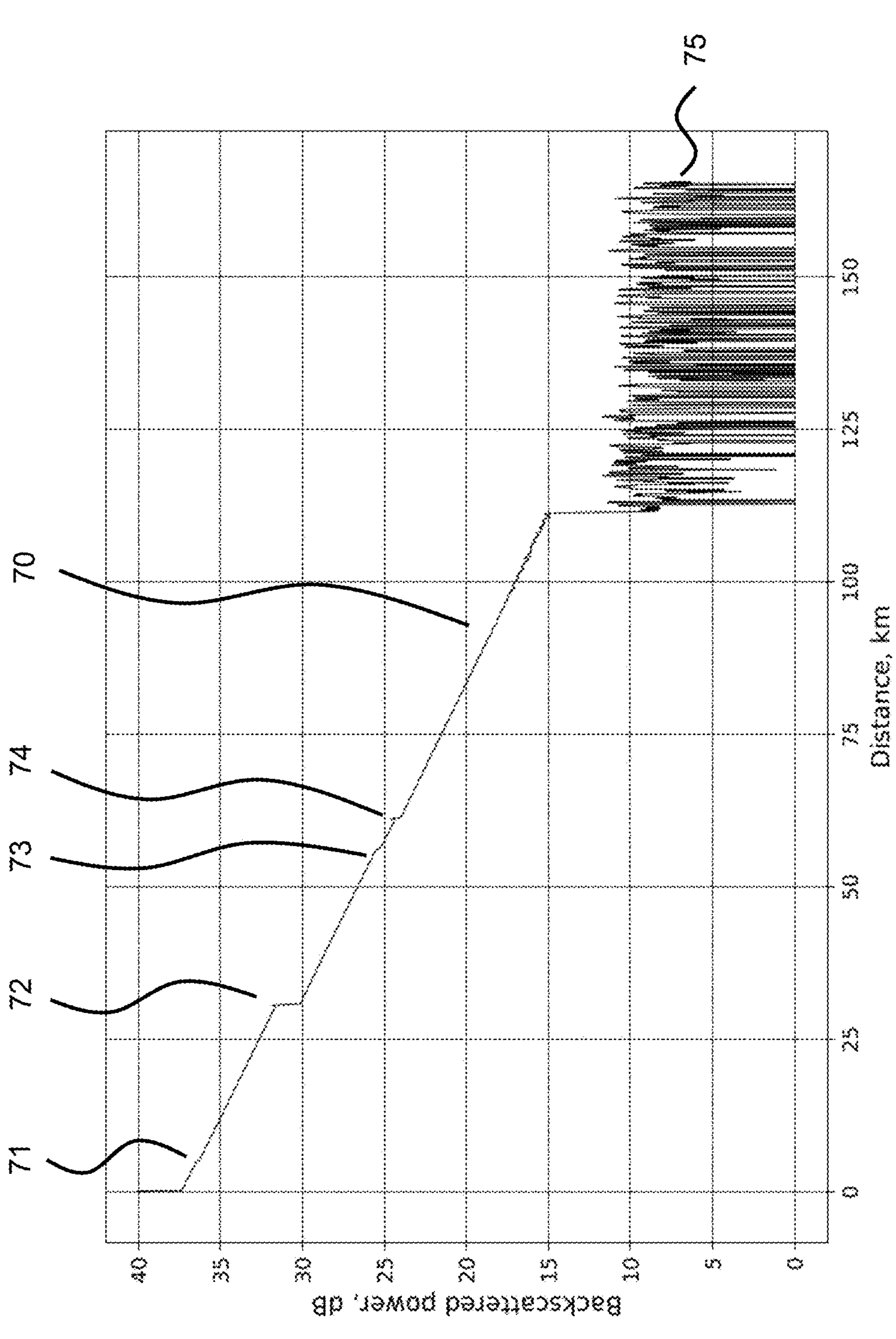
FIG. 7 is shows a reflectogram resulting from optical time-domain reflectometry in accordance with the disclosure.

FIG. 7 shows an exemplary reflectogram resulting from optical time-domain reflectometry corresponding to a signal loss profile. The underlying measurements were carried out with a 2 μs, 1550 nm pulse laser with power less than 100 mW. The experimental data has been averaged over 16 000 measurements.

The reflectogram shows the logarithmic power of backscattered optical signals (in particular of high-intensity optical test pulses) as a function of distance between a reflectometer and the corresponding discontinuity. The reflectometer may be arranged within or close to the first data processing device 11 and/or the second data processing device 12.

The natural signal losses along the transmission line 10 are due to homogenous scattering and result in an exponential decay of power corresponding to linear regions 70. Reflectogram features 71 to 74 comprising deviations from the exponential decay of the reflectogram curve, in particular sharp peaks and/or drops in the reflectogram curve allow for classifying the signal losses at the corresponding position of the transmission line 10. This is especially useful at the initial step 60, where identifying and mitigating local losses is important for comparison with determined losses during key exchange.

The reflectogram features 71 to 74 generally correspond to imperfections of the transmission line 10 and may, e.g., represent low-quality splices, bends and different connectors. Scattering losses from such regions are localized with respect to the transmission line 10. Peaks in the reflectogram features 71 to 74 may result from an excessive scattering which in the case of physical connectors are due to the test pulses undergoing Fresnel reflection. Noisy region 75 at the right-hand side of the reflectogram represents the end of the backscattered signal.

Additionally or alternatively, the transmission line control may comprise transmissometry, i.e., intensities of the test pulses transmitted by the first data processing device 11 and received by the second data processing device 12 are analyzed for classifying the signal losses at respective positions of the transmission line 10. Classification by analyzing received optical signals in the second data processing device 12 may also be carried out in the second data processing device 12. The first data processing device 11 may also be configured to carry out classification, in particular by combining measurements of backscattered test pulse components and of test pulses received in the second data processing device 12.

To discriminate between intrinsic signal losses and artificial signal losses, the initial signal loss profiles are used as a reference. To provide an irreproducible profile, i.e., a physically unclonable structure of the transmission line 10, (passive) optical fiber segments may be slightly doped, e.g., with Al, P, N or Ge. The most general eavesdropping attack corresponds to a unitary transformation of the quantum state of a combined system comprising the propagating signal and an ancillary system. However, the only way to redirect photons is to introduce significant alterations to the optical fiber medium, which would inevitably result in changes from the (initial) reflectogram and would hence be detectable.

The features disclosed in this specification, the figures and/or the claims may be material for the realization of various embodiments, taken in isolation or in various combinations thereof.

The ratio $G_{max}/G_{op}$ between the target maximum gain $G_{max}$ and the target operating gain $G_{op}$ may be determined from an optical signal leakage associated with the transmission line, preferably from a minimum detectable optical signal leakage $$r_E^{min}.$$

The ratio $G_{max}/G_{op}$ between the target maximum gain $G_{max}$ and the target operating gain $G_{op}$ may be between $1+10^{-7}$ and $1+10^{-1}$, preferably between $1+10^{-6}$ and $1+10^{-2}$, more preferably between $1+10^{-5}$ and $1+10^{-3}$.

The difference between the target maximum gain $G_{max}$ and the target operating gain $G_{op}$ may be equal to the minimum detectable optical signal leakage $$r_E^{min}$$

(times the target operating gain $G_{op}$). The minimum detectable optical signal leakage $$r_E^{min}$$

may depend on the transmission line length. For a distance between neighboring optical amplifiers (amplifier interval) of 50 km and a transmission line length of 1000 km-line difference between the target maximum gain $G_{max}$ and the target operating gain $G_{op}$ may be equal to $10^{-6}$; for a transmission line length of 40 000 km equal to $10^{-5}$. The pumping device may thus regularly operate closely to the maximum possible gain of the pumping device. This may restrict the possibilities of an eavesdropper to increase the pumping power and partially divert optical signals.

The target operating gain may be between 3 and 100, preferably between 5 and 20, more preferably between 9 and 11. The maximum operating gain may be between $3+10^{-6}$ and $100+10^{-3}$, preferably between $5+10^{-6}$ and $20+10^{-3}$, more preferably between $9+10^{-6}$ and $11+10^{-3}$.

The target maximum gain may be a maximum achievable gain corresponding to a total population inversion in the active fiber section. The target maximum gain may also be the gain at maximum pumping power.

The target maximum gain $G_{max}$ may be determined from the target operating gain $G_{op}$ and a value of the minimum detectable optical signal leakage $$r_E^{min}$$

determined from the optical signal fluctuations or photon fluctuations (which, in particular, arise during generating and/or amplifying the optical signals). The target operating gain $G_{op}$ may be determined from a transmission coefficient indicating signal losses along the transmission line (in particular signal losses from the first data processing device and/or second data processing device to the optical amplifier or from the optical amplifier to another optical amplifier).

The minimum detectable optical signal leakage $$r_E^{min}$$

may be the minimum leakage arising due to natural losses along the transmission line. The minimum detectable optical signal leakage $$r_E^{min}$$

may be equal to a ratio of the value of optical signal fluctuations and the photon number per pulse of the optical signals. The minimum detectable optical signal leakage $$r_E^{min}$$

may be determined from at least one of a number of optical amplifiers at the transmission line, an initial number of photons n per optical signal/optical pulse, and a transmission probability T. For example, the minimum detectable optical signal leakage $$r_E^{min}$$

may be determined as $$r_E^{min} = \sqrt{MG/n}$$

(or within an interval around it), wherein M is the number of optical amplifiers at the transmission line, n is the initial number of photons per optical signal/optical pulse, and T is the transmission probability of a transmission line section between two neighboring optical amplifiers. The minimum detectable optical signal leakage $$r_E^{min}$$

may be between $10^{-4}$ and $10^{-8}$, preferably between $10^{-5}$ and $10^{-6}$. The initial number of photons n may for example be between $10^{10}$ and $10^{16}$, preferably between $10^{13}$ and $10^{15}$. The transmission probability may the inverse of a photon number drop per distance.

It may be provided that the active fiber section length is determined such that the optical signals with a target maximum signal power are amplified with at most the target maximum gain independent of the pumping power of the pumping device and/or for any pumping power of the pumping device. The pumping power may be restricted by the maximum achievable pumping power of the pumping device and/or damage of fiber-optics components, and/or non-linear processes in the optical fiber.

The target maximum gain $G_{max}$ may be determined as $G_{max}=G_{op}+\delta G$ with $$G_{max} = G_{op} + \delta G \text{ with } \delta G = G_{op} \cdot r_E^{min}.$$

The target maximum gain $G_{max}$ may thus be determined $$G_{max} = G_{op} + G_{op} \cdot r_E^{min}.$$

The target maximum gain *G max* may alternatively be fixed independently of the minimum detectable optical signal leakage.

The method may further comprise determining (and/or monitoring) optical signal losses along the transmission line, preferably optical signal losses depending on a position along the transmission line. In other words, the optical signal losses may be determined as a function of the position along the transmission line. In particular, for each position along the transmission line, corresponding optical signal losses may be determined. The optical signal losses may thus correspond to a signal loss profile.

The optical signal losses may be determined by optical time-domain reflectometry. The optical signal losses may be determined during and/or prior to and/or subsequent to determining the shared key. The optical signal losses may be determined repeatedly. For example, the optical signal losses may be determined repeatedly within a time interval from 10 ns to 50 s, preferably from 10 ns to 10 s, in particular from one of 100 ns to 100 ms, 500 ns to 500 ms, 100 ms to 1000 ms, 0.5 s to 5 s, and 5 s to 10 s.

The method may comprise determining an intrusion event based on the optical signal losses and/or aborting (terminating) determining of the shared key based on the optical signal losses. The method may comprise discarding the shared key based on the optical signal losses.

The method may further comprise determining the target maximum signal power from at least one of a maximum signal intensity of the optical signals, a maximum photon number (per pulse) of the optical signals, a (minimum) pulse duration of the optical signals, and a (maximum) signal frequency (or (minimum) signal wavelength) of the optical signals.

For example, the target maximum signal power may be determined as $P_{s,max}=Nhv_s/t_s$ or $P_{s,max}=Nhc/(\lambda_s t_s)$ with (maximum) photon number per pulse N, signal wavelength $\lambda_s$, signal frequency $v_s$, and signal pulse duration $t_s$. The signal pulse duration $t_s$ may, e.g., be between 0.1 ns and 1 µs. The signal wavelength $\lambda_s$ may for example be between 300 nm and 2500 nm.

The maximum signal intensity and/or the maximum photon number per pulse may be determined depending on the distance between the first and the second data processing device, the distance between neighbouring optical amplifiers and the minimum detectable optical signal leakage.

Determining the active fiber section length may comprise at least one of providing the active fiber section with an initial length; operating the pumping device at maximum pumping power; iteratively determining a gain value and adjusting the length of the active fiber section until the gain value is equal to the target maximum gain; and setting the active fiber section length as the length of the active fiber section for which the gain value is equal to the target maximum gain. As a result, the active fiber section length may be determined with increased accuracy.

The initial length may be greater than an initial estimate of the active fiber section length, for example by a factor between 1% and 20%, preferably between 5% and 15%, more preferably between 9% and 11%.

The maximum pumping power may be a maximum achievable pumping power by the pumping device. The maximum pumping power may thus depend on the pumping device.

Adjusting the length of the active fiber section may comprise shortening and/or extending the active fiber section, for example, successively cutting the active fiber section. The gain value may for example be determined from an input signal intensity (and/or photon number per pulse) to the optical amplifier and an output signal intensity (and/or photon number per pulse) from the optical amplifier.

The pumping device may be a diode and/or a laser. The pumping device may be configured to emit radiation with the pumping wavelength.

Determining the active fiber section length may comprise determining the active fiber section length via a function depending on the target maximum gain, the maximum pumping power, and the maximum signal power, preferably determining the active fiber section length as $$l = \frac{\ln G_{max}}{d(P_{p,max}, P_{s,max})}$$

with $G_{max}$ denoting the target maximum gain, $P_{p,max}$ the maximum pumping power, $P_{s,max}$ the maximum signal power, and d a function depending on $P_{p,max}$ and $P_{s,max}$. The active fiber section length may thus be determined quickly and efficiently.

The function d may be $d(P_{p,max}, P_{s,max})=\sigma_a(v_s)\rho((\eta_s+1) n_2 (P_{p,max}, P_{s,max})-1)$ with metastable state population $n_2$, absorption cross sections $\sigma_a(v_s)$, dopant concentration $\rho$, maximum signal power $P_{s,max}$, maximum pumping power $P_{p,max}$, and signal frequency $v_s$. The active fiber section length l may in particular be determined as $l=\ln G_{max}/\sigma_a(v_s) \rho((\eta_s+1)n_2(P_{p,max}, P_{s,max})-1)$.

The metastable state population may be $n_2(P_{p,max}, P_{s,max}) = \rho\left(\frac{P_{p,max}}{P_{sat}} + \frac{1}{1+\eta_s}\frac{P_{s,max}}{P_{sat}}\right) / \left(1 + \frac{P_{s,max}}{P_{sat}} + \frac{P_{p,max}}{P_{sat}}\right)$ with dopant concentration $\rho$, pumping radiation frequency $v_p$, frequency of the signal frequency $$v_s, \eta_s = \frac{\sigma_e(v_s)}{\sigma_a(v_s)}, \eta_p = \frac{\sigma_e(v_p)}{\sigma_a(v_p)},$$

emission cross-sections $\sigma_e(v_p)$, $\sigma_e$ $(v_s)$, absorption cross sections $\sigma_a(v_p)$, $\sigma_a(v_s)$, maximum signal power $P_{s,max}$, maximum pumping power $P_{p,max}$, and saturation powers $P_{sat}$, $P_{sat}$.

The emission and absorption cross sections $\sigma_e(v_p)$ $\sigma_e(v_s)$, $\sigma_a(v_p)$ $\sigma_a(v_s)$ may be determined via emission and absorption spectra (e.g., from spectral analysis) and, preferably, subsequent division by the dopant concentration $\rho$.

Determining the operating pumping power ($P_{p,op}$) may comprise iteratively determining a gain value and adjusting the pumping device until the optical signals are amplified with the target operating gain when operating the pumping device at the operating pumping power. Additionally or alternatively, the operating pumping power may be determined via formulae depending on the maximum signal power, the target operating gain, and the active fiber section length.

The optical signals for determining the shared key may comprise a signal power equal to or less than the target maximum signal power.

The method may further comprise providing the active fiber section with at least one of an Erbium-doped fiber section, a thulium-doped fiber section, a neodymium-doped fiber section, and an ytterbium-doped fiber section.

The method may further comprise providing the transmission line free of an optical isolator and/or free of a tap coupler.

In particular, all optical fiber sections between the first data processing device and the second data processing device may be provided free of an optical isolator and/or free of a tap coupler.

The method may further comprise providing the optical amplifier as a bidirectional optical amplifier. As a result, optical signals may be transmitted via the same optical fiber from the first data processing device to the second data processing device and from the second data processing device to the first data processing device.

The optical signals are emitted within a signal wavelength range such that a spectral gain deviation of the optical amplifier is not greater than 10%, preferably not greater than 1%. Thus, the stability of the gain of the optical amplifier may be controlled. The spectral gain deviation may indicate the possible (relative) gain deviation when varying the signal wavelength.

The optical signals may for example be emitted in a signal wavelength range from 1200 nm to 1600 nm, preferably from 1526 nm to 1534 nm, more preferably from 1529 nm to 1531 nm.

The method may further comprise disposing a plurality of optical amplifiers at the transmission line, each comprising a (further) pumping device and a (further) active fiber section having the active fiber section length. Preferably, determining the shared key may comprise amplifying the optical signals via the plurality of optical amplifiers by operating each further pumping device at the operating pumping power. The optical amplifiers may be disposed equidistantly along the transmission line. Thus, effective signal transmission along longer transmission lines may be provided.

The method may further comprise disposing the plurality of optical amplifiers with an optical amplifier distance between two adjacent optical amplifiers between 30 km and 200 km, preferably between 30 km and 60 km.

The method may comprise at least one of providing the transmission line (in particular for transmitting the optical signals between the first data processing device and the second data processing device), providing an optical amplifier, disposing the optical amplifier at the transmission line, and providing the optical amplifier with an active fiber section and/or a pumping device. The transmission line may comprise and/or be provided with an optical fiber and/or a plurality of optical fiber sections. The optical fiber (sections) may comprise passive fiber (sections). The optical fiber (sections) may for example comprise SMF-28 fiber (sections).

The active fiber section may be part of the transmission line. The active fiber section may be connected to the optical fiber (sections) of the transmission line, e.g., via spliced connections. The pumping device may be coupled with the transmission line, in particular the active fiber section, via a supply (optical) fiber and/or a coupling element. In particular, pumping radiation emitted from the pumping device may pass the supply fiber and/or may (subsequently) be fed into the transmission line via the coupling element. The coupling element may be configured to guide radiation with different wavelengths and/or from different optical fibers into a single optical fiber. The coupling element may for example be a wavelength-division multiplexing (WDM) system/element. The supply fiber may be a passive fiber. The supply fiber may be configured such that it comprises maximum transmissibility for radiation at the pumping wavelength. For example, the supply fiber may be a HI1060FLEX fiber.

The pumping device comprise a diode and/or a laser. The pumping device may be configured to emit radiation at a pumping wavelength of the active fiber section.

The transmission line may be (at least partially or completely) sealed with an encapsulating compound. In particular, the optical fiber (sections) of the transmission line and/or the optical amplifier and/or the pumping device and/or the supply fiber may be (at least partially or completely) sealed with the encapsulating compound. The encapsulating compound may be silicon-based. The encapsulating compound may additionally comprise metal particles, for example, aluminum particles. The transmission line may have a transmission line length between 60 km and 40 000 km.

The system may or may not comprise the first and the second data processing device and/or a further data processing device. The method may be carried out in a data processing device, for example in the first, the second, and/or the further data processing device. Determining the active fiber section length and/or determining operating pumping power may or may not be carried out in a data processing device such as the first, the second, and/or the further data processing device. The first, the second, and/or the further data processing device may be connected to the optical amplifier, in particular to the pumping device. The optical signals may be emitted from the first and/or second data processing device.

Determining the shared key may comprise at least one of determining, using a random number generator, a bit sequence in the first data processing device; encoding the bit sequence into optical signals; transmitting the optical signals to the second data processing device via the transmission line; amplifying the optical signals by the optical amplifier with operating pumping power and active fiber section length; receiving and measuring the optical signals by the second data processing device; discarding inconclusive signal bits from the (received) bit sequence in the first and/or second data processing device; disclosing, by the first and/or second data processing device, a part of the bit sequence and/or the received bit sequence via a classical channel and carrying out error correction on the bit sequence and the received bit sequence; and determining an amplified key sequence corresponding to the shared key from the error corrected bit sequence using privacy amplification.

The aforementioned embodiments related to the method for quantum key distribution can be provided correspondingly for the system for quantum key distribution.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for quantum key distribution, the method being implementable in a system, the system comprising:

a transmission line for transmitting optical signals between a first data processing device and a second data processing device; and an optical amplifier disposed at the transmission line, the optical amplifier comprising an active fiber section and a pumping device (16);

the method comprising:

determining a ratio between a target maximum gain and a target operating gain of the optical amplifier;

determining an active fiber section length such that the optical signals with a target maximum signal power are amplified with at most the target maximum gain;

determining an operating pumping power of the pumping device below the maximum pumping power such that the optical signals are amplified with a target operating gain according to the determined ratio between the target maximum gain and the target operating gain; and determining a shared key between the first data processing device and the second data processing device by quantum key distribution comprising amplifying the optical signals via the optical amplifier by operating the pumping device at the operating pumping power.

2. The method according to claim 1, wherein the ratio between the target maximum gain and the target operating gain is determined from an optical signal leakage associated with the transmission line.

3. The method according to claim 2, wherein the optical signal leakage associated with the transmission line is a minimum detectable optical signal leakage.

4. The method according claim 1, wherein the ratio between the target maximum gain and the target operating gain is between $1+10^{-7}$ and $1+10^{-1}$.

5. The method according to claim 1, wherein the target maximum gain is a maximum achievable gain corresponding to a total population inversion in the active fiber section.

6. The method according to claim 1, wherein the target maximum gain is the gain at maximum pumping power.

7. The method according to claim 1, further comprising determining optical signal losses along the transmission line.

8. The method according to claim 7, wherein the signal losses depend on a position along the transmission line.

9. The method according to claim 1, further comprising determining the target maximum signal power from at least one of a maximum signal intensity of the optical signals, a maximum photon number of the optical signals, a pulse duration of the optical signals, and a signal frequency of the optical signals.

10. The method according to claim 1, wherein determining the active fiber section length comprises:

providing the active fiber section with an initial length;

operating the pumping device at maximum pumping power;

iteratively determining a gain value and adjusting the length of the active fiber section until the gain value is equal to the target maximum gain; and setting the active fiber section length as the length of the active fiber section for which the gain value is equal to the target maximum gain.

11. The method according to claim 1, wherein determining the active fiber section length comprises determining the active fiber section length via a function depending on the target maximum gain, the maximum pumping power, and the maximum signal power.

12. The method according to claim 11, wherein the active fiber section length is determined as $$l = \frac{\ln G_{max}}{d(P_{p,max}, P_{s,max})}$$

with $G_{max}$ denoting the target maximum gain, $P_{p,max}$ the maximum pumping power, $P_{s,max}$ the maximum signal power, and d a function depending on $P_{p,max}$ and $P_{s,max}$.

13. The method according to claim 1, wherein the optical signals for determining the shared key comprise a signal power equal to or less than the target maximum signal power.

14. The method according to claim 1, further comprising providing the active fiber section (15) with at least one of an Erbium-doped fiber section, a thulium-doped fiber section, a neodymium-doped fiber section, and an ytterbium-doped fiber section.

15. The method according to claim 1, further comprising providing the transmission line free of an optical isolator and free of a tap coupler.

16. The method according to claim 1, further comprising providing the optical amplifier as a bidirectional optical amplifier.

17. The method according to claim 1, wherein the optical signals are emitted within a signal wavelength range such that a spectral gain deviation of the optical amplifier is not greater than between 1 to 10%.

18. The method according to claim 1, further comprising disposing a plurality of optical amplifiers at the transmission line, each oof the plurality of optical amplifiers comprising a further pumping device and a further active fiber section having the active fiber section length, wherein determining the shared key comprises amplifying the optical signals via the plurality of optical amplifiers by operating each further pumping device at the operating pumping power.

19. The method according to claim 18, further comprising disposing the plurality of optical amplifiers with an optical amplifier distance between two adjacent optical amplifiers between 30 km and 200 km.

20. A system for quantum key distribution comprising:

a transmission line for transmitting optical signals between a first data processing device and a second data processing device;

an optical amplifier disposed at the transmission line with an active fiber section and a pumping device;

wherein the system is configured to carry out a method, the method comprising:

determining a ratio between a target maximum gain and a target operating gain of the optical amplifier;

determining an active fiber section length such that the optical signals with a target maximum signal power are amplified with at most the target maximum gain;

determining an operating pumping power of the pumping device below the maximum pumping power such that the optical signals are amplified with a target operating gain according to the determined ratio between the target maximum gain and the target operating gain; and determining a shared key between the first data processing device and the second data processing device by quantum key distribution comprising amplifying the optical signals via the optical amplifier by operating the pumping device at the operating pumping power.

* * * * *